March 8, 1960
C. M. GRUENDLING
2,927,361
BRICK HANDLING MACHINE
Filed Feb. 27, 1958
5 Sheets-Sheet 1
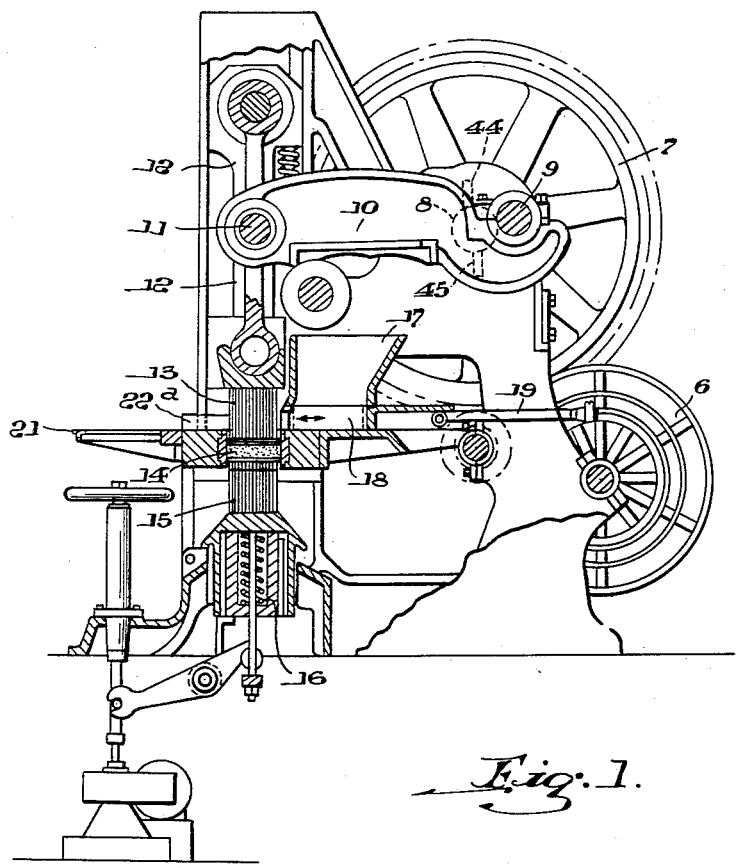
Fig. 1.
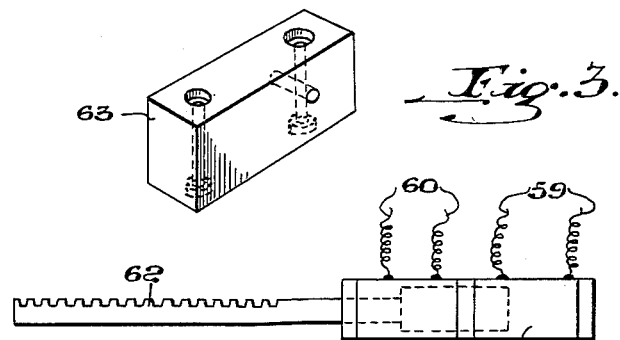
Fig. 3.
Fig. 4.
INVENTOR.
CHARLES M. GRUENDLING.
BY Archworth Martin
his ATTORNEY.

March 8, 1960 C. M. GRUENDLING 2,927,361
BRICK HANDLING MACHINE
Filed Feb. 27, 1958 5 Sheets-Sheet 2
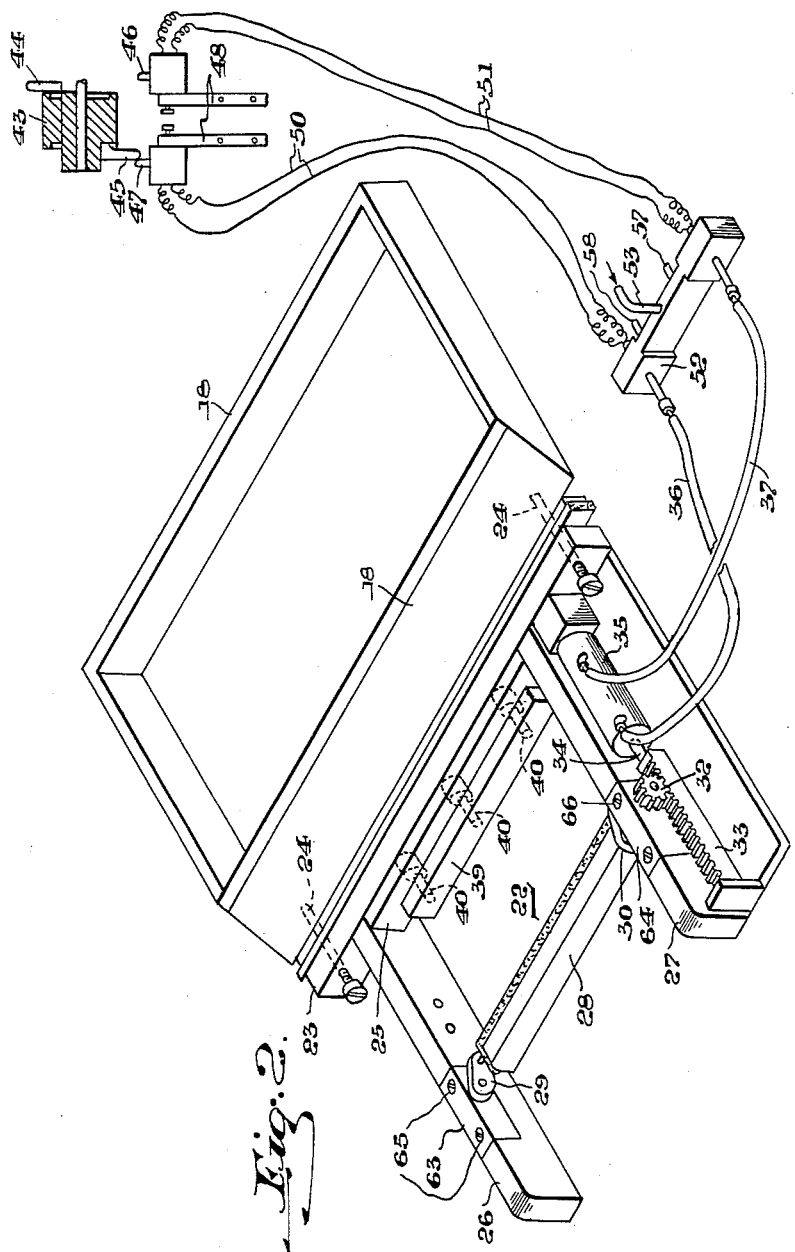
INVENTOR.
CHARLES M. GRUENDLING.
BY Archworth Martin
his ATTORNEY.

March 8, 1960  C. M. GRUENDLING  2,927,361
BRICK HANDLING MACHINE
Filed Feb. 27, 1958  5 Sheets-Sheet 3

INVENTOR.
CHARLES M. GRUENDLING.
BY Ashworth Martin
his ATTORNEY.

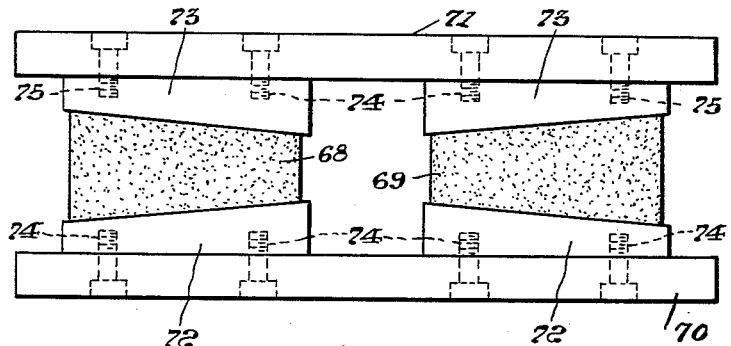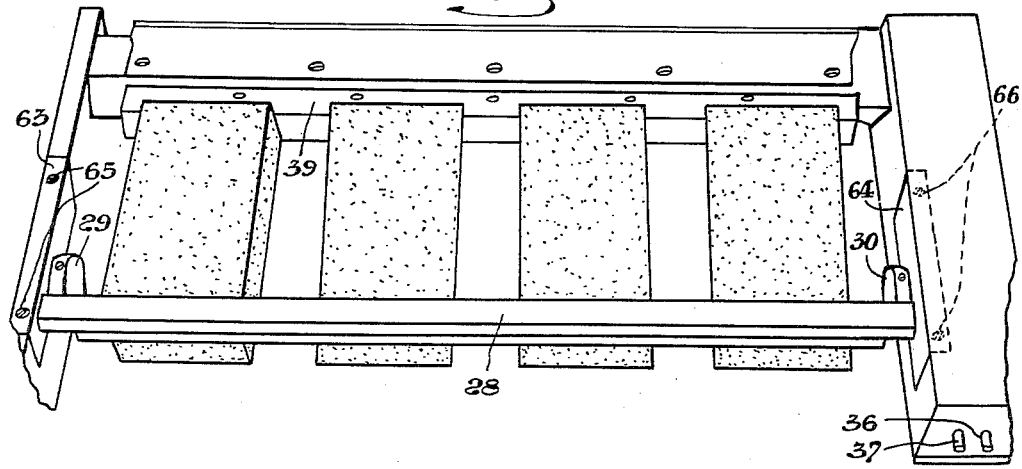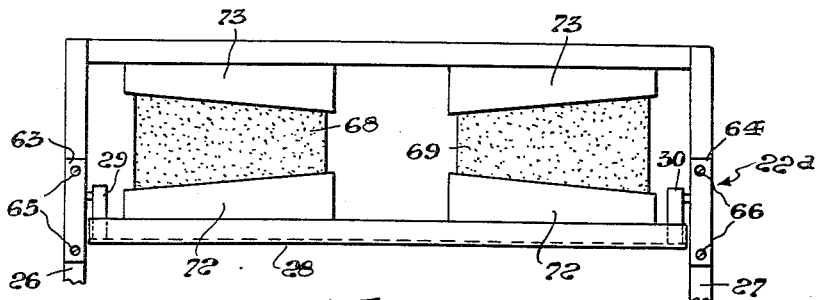

March 8, 1960
C. M. GRUENDLING
2,927,361
BRICK HANDLING MACHINE
Filed Feb. 27, 1958
5 Sheets-Sheet 5
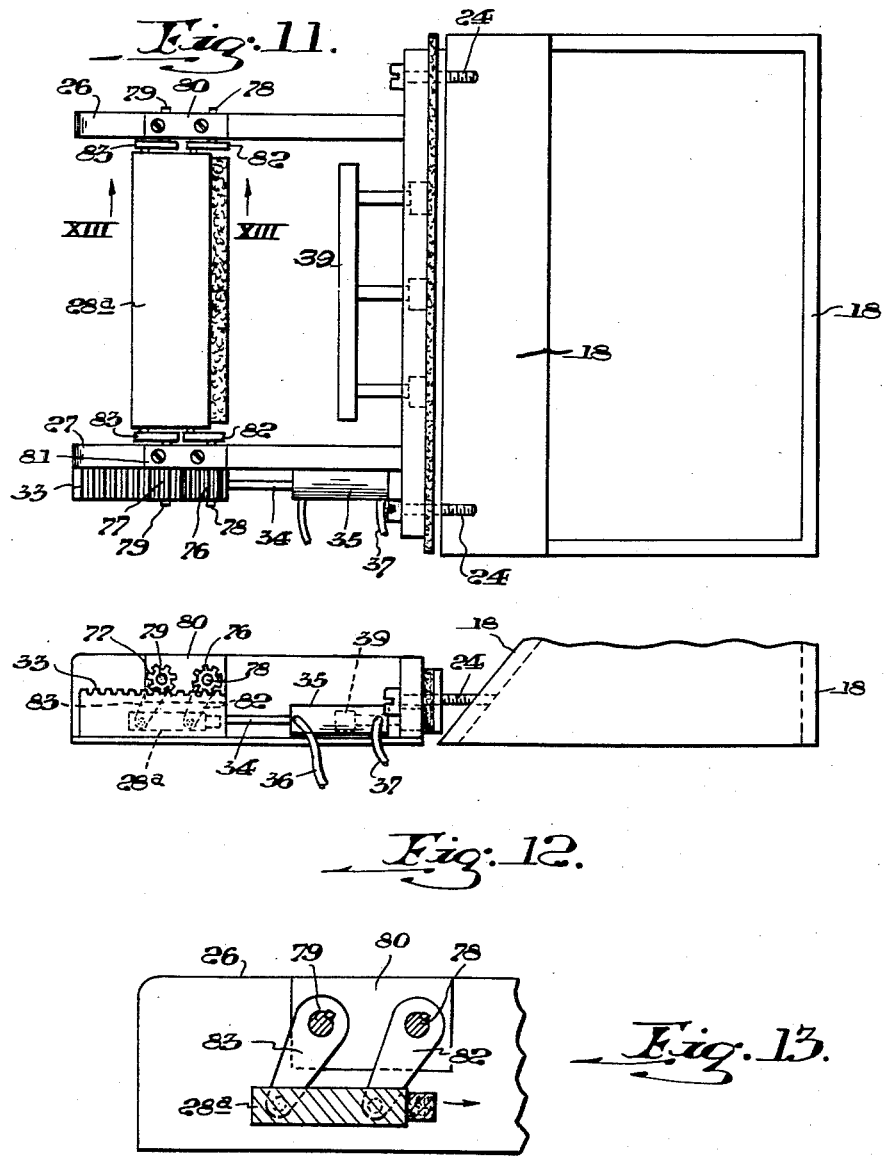
INVENTOR.
CHARLES M. GRUENDLING.
BY Archworth Martin
his ATTORNEY.

United States Patent Office 2,927,361
Patented Mar. 8, 1960

2,927,361

BRICK HANDLING MACHINE

Charles M. Gruendling, Latrobe, Pa., assignor to Riverside Tool & Die Co., Latrobe, Pa., a corporation of Pennsylvania Application February 27, 1958, Serial No. 718,094

5 Claims. (Cl. 25—1)

My invention relates to apparatus that is particularly suitable for handling of friable material such as newly pressed bricks, it being here shown and described as used in connection with brick pressing machines, for the lifting and removal of bricks therefrom.

The invention comprises modification of that described and claimed in my application Ser. No. 643,603, filed March 4, 1957.

The said application describes the advantages of transferring bricks by lifting them rather than simply sliding them from the table of the pressing machine, and the various advantages in connection with the lifting and transferring of the bricks to a pallet or a conveyor.

One object of the present invention is to provide an apparatus of the character referred to which may conveniently be used to transfer bricks of tapered form from a machine to a pallet or conveyor and which may readily be adapted to use with either bricks having tapered sides or bricks of rectangular form.

Another object of my invention is to provide transfer device which can readily be changed to handle bricks of various widths or lengths.

The transfer apparatus is here shown as employed in connection with a conventional form of molding press for shaping bricks, either in multiple, simultaneously, or one by one. It is therefore not necessary to show and describe the pressing mechanism in detail.

As shown in the accompanying drawings:

Figure 1 is a side elevation, partly in section of a pressing machine of conventional form to which my transfer apparatus may be applied.

Fig. 2 is a perspective view showing lifting and transfer apparatus of the type that may be adjusted to handle bricks of various lengths or widths.

Fig. 3 is a perspective view on an enlarged scale of one of the adjustable bearing blocks of Fig. 2.

Fig. 4 shows a modification of the mechanism for operating one of the lifting bars of Fig. 2.

Fig. 8 is a detailed view of a portion of the structure of Fig. 7.

Fig. 9 is a view showing the lifter employed in transferring a number of bricks from several presser heads, simultaneously.

Fig. 10 shows a lifting frame that contains both the adjusting mechanism of Fig. 2 and the tapered blocks of Fig. 8.

Fig. 11 is a plan view showing a modification of the gripper mechanism of Fig. 3.

Fig. 12 is a side elevational view of Fig. 11.

Fig. 13 is an enlarged view on the line XIII—XIII of Fig. 11.

Figure 5:
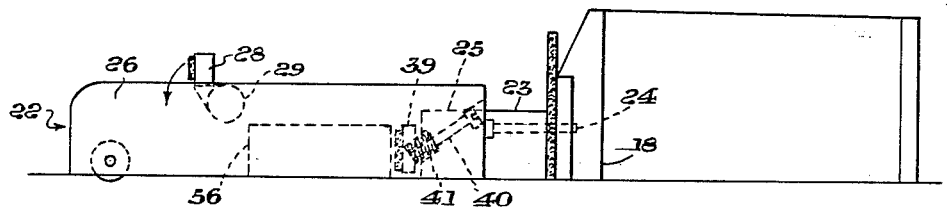
Fig. 5 shows the positions of the lifter bars preliminary to the gripping of a brick.

The apparatus as shown in Fig. 1 comprises the usual drive pulley 6 that has geared connection with a gear wheel 7 which is carried on a shaft 8 and has a crank pin 9 connected to a crank arm or link 10 which in turn has pivoted connection at 11 with a pair of toggle links 12, to thereby raise and lower a brick presser 13 above a mold cavity 14, the presser being reciprocated vertically during rotation of the gear wheel 7. A lower presser block 15 is yieldably held in upwardly projected position by a spring 16.

A stationary charging hopper 17 directs the processed brick material into a charger 18 that is reciprocated horizontally by a link 19 or the like to carry charges of material into position above the mold cavity 14, at a time when the toggle 12 is collapsed and the presser 13 in its uppermost position. The charger 18 is then automatically withdrawn to receive another charge and at that instant, the toggle 12 is straightened to project the presser 13 down against the clay and to squeeze the clay between the pressers 13 and 15. Further movement of the shaft 8 withdraws the presser 13 upwardly and the brick is raised by the press or plunger 15 into position to be moved off the upper surface of the press 15 toward a table or pallet 21, when the charger 18 again moves forward with another mass of clay for forming the next brick. These parts are all well known in the patented art and the brick-making industry, and need not be further described, since my invention relates primarily to an attachment and apparatus that will operate in timed relation to the foregoing movements and operations, to lift and remove the newly pressed bricks from the pressing station otherwise than by having them simply pushed out of the way by the charger as has heretofore been a common practice.

My frame for the lifting and takeoff apparatus is designated generally by the numeral 22 and carries a back bar 23 which is secured to the frame of the charger 18, by bolts or screws 24. A rear frame bar 25 is secured to the back bar 23, and the side bars 26 and 27 are carried by the members 23 and 25. A rocker arm 28 that is padded, serves as a gripper and is carried by trunnions 29 and 30 journalled in the side bars of the frame.

A pinion 32 is secured to the shaft of the trunnion 30, the trunnions 29 and 30 supporting the gripping bar 28 in eccentric relation to the axis of the pinion 32. The pinion 32 meshes with a rack 33 that is connected to a piston rod 34 whose piston is contained within an air cylinder 35, to the opposite ends of which air lines 36 and 37 are connected for effecting reciprocation of the rack and oscillation of the gripping bar 28. A gripper bar 39 padded with a facing of some soft material such as felt, rubber or leather, etc., carries rods 40 that are slidably supported in the frame member (Fig. 5) 25. The bar 23 is recessed to receive expansion springs 41 that are interposed between a recessed wall in the bar 25 and the rear side of the bar 39. The springs 41 thus yieldably project the gripper bar 39 toward the other gripper bar 28, to engage a brick.

The shaft 8 carries a bracket 43 to which is secured a pair of switch operating members 44 and 45 which will sequentially be brought into engagement with push buttons or plungers of micro switches 46 and 47, respectively, during each revolution of the shaft 8. The switches 46 and 47 are mounted on bracket members 48 that are secured to the machine frame and are respectively connected, through conductors 50 and 51, with coils in a double acting solenoid valve 52 to which air pressure is supplied through a line 53 and which in turn supplies and exhausts air through the hose pipes 36 and 37 to the cylinder 35. When air is supplied through the line 36 to one end of the cylinder 35, the other end of the cylinder will exhaust through an exhaust port 57, while when the direction of air flow is reversed exhaust will be from the other end of the cylinder through a port 58.

Figure 6:
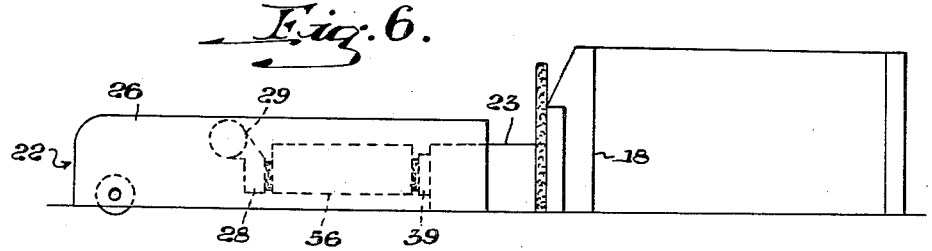
Fig. 6 shows the bars holding a brick in lifted position ready for forward movement from the pressing machine.

The switch-operating members 44—45 are so positioned on the shaft 8 that after a brick has been pressed and the arm 10 retracted to collapse the toggle 12 and raise the presser 13, the switch arm 44 will close the switch at 46 to effect admission of fluid pressure through line 37 to one end of the cylinder 35 thus retracting the rack bar 33 from the position shown in Fig. 2 and swinging the gripping bar 28 in a counter clock-wise direction from the position shown in Fig. 5 to the position shown in Fig. 6. This movement is effected while the brick is still on the press member 15 and at the time the charger 18 is being started forward in a direction to remove the brick from the member 15. This swinging movement of the gripping bar 28 causes it to move through an arc near the end of which it will engage and slightly lift the forward edge of the brick 56. At this time the frame 22 is moving forward and engages the rear edge of the brick 56, and there is then slight rearward movement of said bar in a upwardly sloping direction by reason of the guide rods 40. The brick is thus yieldably gripped and lifted slightly. Continued forward movement of the charger 18 causes the frame and the brick to be carried to a pallet or other supporting surface at 21.

When the charger has been moved to the limit of its forward movement, above the pallet 21, the switch-operating member 45 will have been brought into engagement with the switch 47 to close it and admit fluid pressure through the line 36 to the rear end of the cylinder 35, thereby rocking the bar 28 in a clock-wise direction from the position of Fig. 6 to that of Fig. 5, where it will be higher than the brick, to thus clear the brick when the frame is again moved rearwardly. When the grippers have released the brick, it will be deposited upon the pallet 21.

By reason of the slight upward movement of the bar 28 at nearly the end of its counter clock-wise movement and the sliding of the bar 39 on the pins 40, the brick will be lifted somewhat and of course, will then be carried forward along with the frame 22 and the charger 18. It will thus be seen that at the end of each rearward movement of the frame 22, the bars 28 and 39 will be in lowered position, while at the beginning of the forward movement they will be raised to grip a brick. Hydraulic pressure can be used instead of air pressure for the cylinder 35. Also, the frame 22 and the gripping bars can be of such length as to move several bricks simultaneously as shown in Fig. 9, when used on a machine that presses a plurality of bricks at the same time.

In Fig. 4, I show a modification of the structure of Fig. 2, wherein electrical conductors 59 and 60 correspond to the conductors 50 and 51 of Fig. 2 and supply current alternately in reverse directions through a double-acting solenoid 61 whose core is connected to a rack bar 62 that corresponds to the rack bar 33.

Referring further to Figs. 2 and 3, the means for adjusting the gripper bar 28 to adapt it to bricks of various lengths or widths comprises a pair of bearing blocks 63 and 64 in which the trunnions 29 and 30 of the bar 28 are journalled. The shafts for the trunnions being located closer to one end of each block than to the other so that when the blocks are reversed by turning them up-side-down end-for-end, the trunnions will be farther away from the gripper bar 39 than they are in Fig. 2, thereby enabling the device to be used to handle longer bricks. The blocks are releasably held in place by the cap screws 65 and 66 respectively, which are counter-sunk into the tops of the blocks, such counter-sinks being provided in the upper and lower sides of the blocks.

Since the trunnions 29 and 30 are completely rotatable on the blocks 63 and 64, except insofar as they are restrained by the pinion and rack 32—33, the turning of the blocks end-for-end, in vertical planes will not interfere with the operation of the rocker bar 28 by the rack 33.

Figure 7:
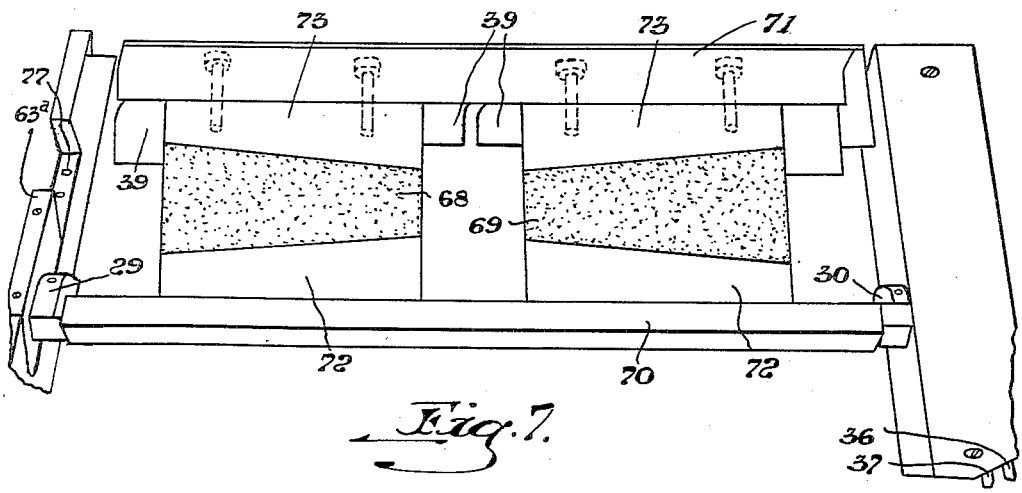
Fig. 7 shows a modification of the structure of Fig. 2, which may be adapted to bricks of non-rectangular form.

Referring now to Figs. 7 and 8 and 10, I show adaptation of the machine to the handling of bricks of tapered form such as those used as keystones or in walls that have some radius. The bricks are here represented by the numerals 68 and 69. A gripper bar 70 corresponds to the gripper bar 28 of Fig. 2 and a gripper bar 71 corresponds to the bar 39 of Fig. 2. Tapered filler blocks 72 and 73 are secured to the bars 70 and 71 by cap screws 74 and 75 (Fig. 8). The lifter 22a can be used for lifting rectangular bricks or tapered bricks, depending upon whether or not the filler blocks are used.

In Fig. 7 is shown still another manner of adjusting the swinging gripper bar 70. In this arrangement, the bearing blocks 63a are adjustable along slots in the side frames that contain holes 77.

By having the gripper frame 22 or 22a attached to the front of the charger 18, it will never be drawn as far rearwardly as the hopper 17 and therefore, no clay will enter the frame. It will further be seen that although when using the lifter to transfer either rectangular bricks or tapered bricks, the gripper members move in approximately rectilinear directions toward and from the front and rear faces of the bricks so as to grip them evenly across their entire lengths or widths and thus reduce danger of cracking them.

Figures 12 and 13 show apparatus for mounting and operating a gripper bar 28a in a somewhat different manner than the gripper bar 28. In this case, a pair of pinions 76 and 77 that will mesh with the rack bar 33 are secured to shafts 78 and 79 that are journaled in blocks 80 and 81. A pair of crank arms 82 are keyed to the shaft 78 and a pair of crank arms 83 are keyed to the shaft 79. At their lower ends, the crank arms are pivotally connected to the gripper bar 25a. There is thus what is, in effect, a parallel link arrangement that will always maintain the bar 85 in a horizontal plane at all rotative positions of the shafts 78 and 79 so that movement of the bar is in a direction approximately perpendicular to the vertical faces of the bricks, when it is moving to gripping position. This avoids injury to the bricks such as would occur if the gripper moved in an arcuate path. Such an arcuate path would also require greater clearance below the bar 28a.

This arrangement is particularly useful in adapting the gripper to bricks of various widths, and is useful in conjunction with bricks, either tapered or not tapered. Substitution of the grippers can readily be effected by removing one set of bearing blocks (63—64) and substituting another set (80—81) that has the desired shaft and gripper arrangement.

I claim as my invention:

1. Brick handling apparatus for removing bricks from a forming station, that comprises a frame, mechanism for reciprocating the frame in a horizontal plane, a gripper bar supported in one end of the frame, a second gripper bar in the other end of the frame, a pair of rock shafts journaled in said other end of the frame, crank arms rigidly connected to the ends of each shaft and respectively pivotally connected to the bar adjacent to its four corners at horizontally-spaced points, the arms being parallel to one another and of equal length, a rack bar carried by the frame along one side thereof, a pinion connected to one shaft and meshing with the rack bar, and means operatively connected to the said mechanism and thus operating in timed relation to reciprocatory movements of the frame, for reciprocating the bar and thus oscillating the shafts and moving the second-named gripping bar toward and from the other gripping bar.

2. Apparatus as recited in claim 1, wherein each of the rock shafts has a pinion that meshes with the rack bar.

3. Apparatus as recited in claim 1, wherein the gripper bars have brick-engaging surfaces that are relatively angular with respect to the longitudinal axes of the bars and positioned to engage the longitudinal edges of a tapered brick, at all areas simultaneously upon operation of the gripper bars to pick up a brick.

4. The combination with brick-pressing apparatus that has a horizontally-reciprocable member which is movable forwardly and rearwardly relative to a pressing station, of a frame connected at its rear end to the forward side of said member and open to receive bricks at the pressing station, when the said member is in its rearward position, a gripper bar positioned crosswise in the rear end of the frame, a second transversely extending gripper bar crosswise in the forward end of the frame, bearing blocks removably mounted in the sides of the frame near its forward end, a rock shaft journalled in the blocks and having trunnions rigidly mounted thereon between the sides of the frame and connected to the ends of the second-named gripper bar, a pinion on an end of the rock shaft, a rack carried by a side of the frame and meshing with the pinion, and means operating in timed relation to forward and rearward movements of the frame, for reciprocating said rack and thereby rocking the second-named gripper bar, the shaft being journaled in the blocks closer to one end of each block than the other, and the blocks being reversible in the frame, to change the distance from the rock shaft to the first-named gripper bar.

5. The combination with brick-pressing apparatus that has a horizontally-reciprocable member which is movable forwardly and rearwardly relative to a pressing station, of a frame connected at its rear end to the forward side of said member and open to receive bricks at the pressing station, when the said member is in its rearward position, a yieldably mounted gripper bar positioned crosswise in the rear end of the frame for movement in a rearwardly and upwardly sloping direction, a second gripper bar crosswise in the forward end of the frame, bearing blocks removably mounted in the sides of the frame near its forward end, a rock shaft journalled in the blocks and having trunnions rigidly mounted thereon between the sides of the frame and connected to the ends of the second-named gripper bar, a pinion on an end of the rock shaft and outside the frame, a toothed rack slidably carried by a side of the frame at its exterior surface and meshing with the pinion, a cylinder carried by the frame and having a piston and piston rod connected to the rack, the cylinder and the rack being disposed longitudinally of the frame, and means operating in timed relation to rearward and forward movements of the frame, for reciprocating said rack and thereby rocking the rock shaft and the second-named gripper bar, to engage and release the bricks References Cited in the file of this patent
UNITED STATES PATENTS

| 2,685,117 | Rivers | Aug. 3, 1954 |
| 2,836,873 | Lingl | June 3, 1958 |

FOREIGN PATENTS

| 463,687 | Canada | Mar. 14, 1950 |